(12) United States Patent
Sim

(10) Patent No.: US 12,502,254 B2
(45) Date of Patent: Dec. 23, 2025

(54) MANUFACTURING METHOD OF TRANSPARENT DENTAL ALIGNMENT DEVICE AND TRANSPARENT DENTAL ALIGNMENT DEVICE MANUFACTURED BY THE METHOD

(71) Applicant: ODS CO., LTD., Incheon (KR)

(72) Inventor: Miyoung Sim, Incheon (KR)

(73) Assignee: ODS CO., LTD., Incheon (KR)

( * ) Notice: Subject to any disclaimer, the term of this patent is extended or adjusted under 35 U.S.C. 154(b) by 151 days.

(21) Appl. No.: 18/554,127

(22) PCT Filed: Sep. 7, 2022

(86) PCT No.: PCT/KR2022/013440
§ 371 (c)(1),
(2) Date: Oct. 5, 2023

(87) PCT Pub. No.: WO2023/054933
PCT Pub. Date: Apr. 6, 2023

(65) Prior Publication Data
US 2024/0197443 A1      Jun. 20, 2024

(30) Foreign Application Priority Data

Oct. 1, 2021   (KR) ......................... 10-2021-0131145

(51) Int. Cl.
| | |
|---|---|
| *B29C 64/35* | (2017.01) |
| *A61C 7/08* | (2006.01) |
| *B29C 64/124* | (2017.01) |
| *B33Y 10/00* | (2015.01) |

(Continued)

(52) U.S. Cl.
CPC .............. *A61C 7/08* (2013.01); *B29C 64/124* (2017.08); *B29C 64/35* (2017.08); *B33Y 10/00* (2014.12); *B33Y 40/20* (2020.01); *B33Y 80/00* (2014.12)

(58) Field of Classification Search
CPC ...................................... B29C 64/35
See application file for complete search history.

(56) References Cited

U.S. PATENT DOCUMENTS

| | | |
|---|---|---|
| 10,463,456 B2 | 11/2019 | Ruppert et al. |
| 2019/0263070 A1* | 8/2019 | Barth ..................... B33Y 40/20 |
| 2020/0122388 A1 | 4/2020 | Van Esbroeck et al. |

(Continued)

FOREIGN PATENT DOCUMENTS

| | | |
|---|---|---|
| JP | 2018-500071 A | 1/2018 |
| KR | 10-2018-0010293 A | 1/2018 |

(Continued)

*Primary Examiner* — Timothy Kennedy
(74) *Attorney, Agent, or Firm* — You & IP, LLC

(57) ABSTRACT

Disclosed is a Transparent Dental Alignment Device and a manufacturing method for the Transparent Dental Alignment Device. The disclosed manufacturing method for the Transparent Dental Alignment Device includes the steps: 3D printing the dental alignment device using a composition for forming transparent dental alignment devices as the raw material (S10); Removing uncured resin and liquid from the dental alignment device obtained in step S10 (S20); Post-curing the dental alignment device obtained in step S20 (S30); Post heat treatment of the dental alignment device obtained in step S30 (S40); Cleaning the dental alignment device obtained in step S40 (S50).

1 Claim, 2 Drawing Sheets

(51) Int. Cl.
  *B33Y 40/20* (2020.01)
  *B33Y 80/00* (2015.01)

(56) References Cited

U.S. PATENT DOCUMENTS

2021/0171701 A1* 6/2021 Klun .................... C08G 18/227
2021/0323233 A1* 10/2021 Dias ...................... B33Y 80/00

FOREIGN PATENT DOCUMENTS

| KR | 10-2019-0054856 A | 5/2019 | | |
|---|---|---|---|---|
| KR | 10-2020-0040744 A | 4/2020 | | |
| KR | 10-2273407 B1 | 7/2021 | | |
| KR | 10-2022-0026883 A | 3/2022 | | |
| KR | 10-2397444 B1 | 5/2022 | | |
| WO | WO-2017009646 A1 * | 1/2017 | ............ | F16F 9/0418 |

* cited by examiner

MANUFACTURING METHOD OF TRANSPARENT DENTAL ALIGNMENT DEVICE AND TRANSPARENT DENTAL ALIGNMENT DEVICE MANUFACTURED BY THE METHOD

TECHNICAL FIELDS

A manufacturing method for a transparent dental alignment device and the transparent dental alignment device manufactured by the method are presented. More specifically, the present invention discloses a manufacturing method for a transparent dental alignment device having excellent transparency, as well as a transparent dental alignment device manufactured by the method.

BACKGROUND TECHNOLOGY

Traditional transparent dental alignment devices generally refer to devices that achieve the desired tooth adjustment by hot-pressing molding of plate-shaped transparent polymeric composite resin (referred to as "resin") with thermoelastic properties. This transparent dental alignment device is aesthetically superior to traditional orthodontic devices, as it does not have noticeable structures or metal wires protruding from the teeth and is nearly transparent in color.

Many people desire orthodontic treatment but choose not to undergo it due to concerns about the negative impact of visible devices on their professional or personal lives and self-confidence. Thus, the advantages of transparent dental alignment devices alleviate these concerns and allow people to comfortably undergo orthodontic treatment without the social burden. Moreover, as the thickness of the device is thin, it ensures a comfortable fit, and it can be temporarily removed from the oral cavity for eating and oral hygiene, significantly reducing any discomfort in daily life. Considering the high prevalence of malocclusions in the population, public interest and demand for orthodontic treatment using transparent alignment devices are dental inevitably great. As a result, the market size related to transparent dental alignment devices is continuously expanding.

However, existing transparent dental alignment devices have not been able to fully meet the aesthetic demands of users because transparency is not high enough. In addition, even transparent alignment devices produced by using 3D printing techniques, instead of thermoelastic resins, face difficulties in achieving a sufficiently high level of transparency through post-processing. These difficulties have hindered the devices from satisfying users' aesthetic requirements.

DETAILED DESCRIPTION OF THE INVENTION

Technical Challenges

The first embodiment of the present invention provides a manufacturing method that enables the production of a transparent dental alignment device with superior transparency. Another embodiment of the present invention offers a transparent dental alignment device that is manufactured using the aforementioned method for manufacturing a transparent dental alignment device.

Another embodiment of the present invention delivers a transparent dental alignment device that is manufactured using the aforementioned method for manufacturing a transparent dental alignment device.

Technical Solution

Hereinafter, a method for manufacturing a transparent dental alignment device according to one embodiment of the present invention shall be described in detail.

In this specification, the term "composition for forming transparent dental alignment devices" refers to a material that containing photocurable compounds, photoinitiators, and liquids, but does not contain pigments. It can be in the form of a solution, suspension, or paste. For example, the composition for forming transparent dental alignment devices may be disclosed in Korean Patent Application No. 10-2020-0107965. The entirety of Korean Patent Application No. 10-2020-0107965 is hereby incorporated into this specification.

Moreover, in the present specification, "partial curing" refers to a curing degree ranging from 40% to 90%.

Furthermore, in this specification, "complete curing" refers to a curing degree ranging from 99% to 100%.

The method for manufacturing a Transparent Dental Alignment Device, according to one embodiment of the present invention may include the following steps.

3D printing the dental alignment device using a composition for forming transparent dental alignment devices as the raw material (S10), Removing uncured resin and liquid (e.g., water) from the dental alignment device obtained in step S10 (S20), Post-curing the dental alignment device obtained in step S20 (S30), Post heat treatment of the dental alignment device obtained in step S30 (S40), Cleaning the dental alignment device obtained in step S40 (S50).

The step (S20) can be performed by spraying compressed air with a pressure of 5-12 bar into the dental alignment device mentioned above. If the pressure of the compressed air is within this range, the transparency of the dental alignment device can be improved.

For example, the step S20 can be performed using an air gun.

The step (S30) can be performed at a temperature of 60-90° C. If the post-curing temperature of step (S30) is within this range, the transparency of the dental alignment device can be improved.

The step (S40) can be performed at a rate of less than or equal to 25° C./min, starting from a temperature of 60-90° C. For example, the step (S40) may be performed up to a final temperature of 15-50° C. If the post-heating treatment conditions of step (S40) are within the range, the transparency of the dental alignment device can be improved.

The step (S50) can include a cleaning solution washing step (S50-1) and a water rinsing step (S50-2). For example, the cleaning solution washing step (S50-1) can be performed using a cleaning solution that includes alcohol, isopropyl alcohol, ethanol, tripropylene glycol monomethyl ether (TPM), or a combination thereof.

Between the cleaning solution washing step (S50-1) and the water rinsing step (S50-2), there can be a time interval of 5 minutes or more to allow the cleaning solution to dry completely. If the time interval between the cleaning solution washing step (S50-1) and the water rinsing step (S50-2) is within the mentioned range, the transparency of the dental alignment device can be improved.

Another aspect of the present invention provides a Transparent Dental Alignment Device that is manufactured by the manufacturing method of the Transparent Dental Alignment Device.

The Transparent Dental Alignment Device manufactured in this way has the advantage of superior transparency compared to conventional Transparent Dental Alignment Devices.

Manufacturing Example 1: Preparation of Composition for Forming Transparent Dental Alignment Device As a photocurable compound, a composition for forming a transparent dental alignment device was prepared including Diurethane dimethacrylate (CAS No. 72869-86-4, a mixture of substances where R=H and R=CH3, molecular formula: C23H38N2O8) (PP1) represented by Chemical Formula 1, Bisphenol A ethoxylate dimethacrylate (CAS No. 41637-38-1) (PP2) represented by Chemical Formula 2, Hydroxyethyl methacrylate (CAS No. 868-77-9) (PP3) represented by Chemical Formula 3, Urethane acrylate oligomer (CAS No. 106556-00-7) (PP4) represented by Chemical Formula 4, Triethylene glycol dimethacrylate (CAS No. 109-16-0) (PP5) represented by Chemical Formula 5, Dianal BR-83 (manufactured by Mitsubishi Rayon, glass transition temperature 105° C., weight average molecular weight 40,000) as an acrylic resin, Phenylbis (2, 4, 6-trimethylbenzoyl) phosphine oxide (CAS No. 162881-26-7) as a light polymerization initiator and 2,6-di-tert-butyl-para-cresol as an antioxidant. The materials and contents used in each embodiment and comparative example are shown in Table 1 below. In Table 1 below, the units of each numerical value are weight percent. The content of the acrylic resin, light polymerization initiator, and antioxidant is given as a percentage based on the total weight of the five photopolymerizable compounds.

TABLE 1

| Photopolymerizable compounds | | | | | acrylic resin | photo-initiator | antioxidant |
|---|---|---|---|---|---|---|---|
| PP1 | PP2 | PP3 | PP4 | PP5 | | | |
| 100 | 55 | 40 | 23 | 7 | 2.5 | 6 | 1 |

Embodiment 1: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second dental alignment device was obtained.

Thereafter, the second dental alignment device was post-cured at 75° C. to obtain the third dental alignment device. Then, the third dental alignment device was subjected to post-heating at a rate of 25° C./min, starting from a temperature of 75° C., to reach 25° C., resulting in the fourth dental alignment device. After that, the fourth dental alignment device was thoroughly cleaned with isopropyl alcohol to obtain the fifth dental alignment device. After 5 minutes, the fifth dental alignment device was completely washed with water to obtain a sixth dental alignment device.

[Chemical Formula 1]

[Chemical Formula 2]

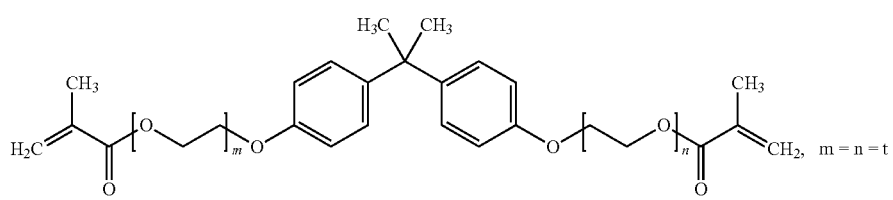

[Chemical Formula 3]

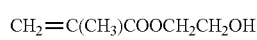

[Chemical Formula 4]

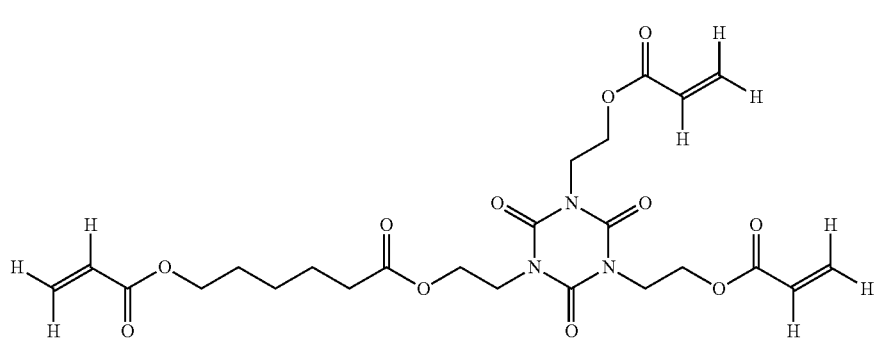

[Chemical Formula 5]

Embodiment 2: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 5 bar to remove uncured resin and liquid, the second dental alignment device was obtained.

Thereafter, the second dental alignment device was post-cured at 75° C. to obtain the third dental alignment device. Then, the third dental alignment device was subjected to post-heating at a rate of 25° C./min, starting from a temperature of 75° C., to reach 25° C., resulting in the fourth dental alignment device. After that, the fourth dental alignment device was thoroughly cleaned with isopropyl alcohol to obtain the fifth dental alignment device. After 5 minutes, the fifth dental alignment device was completely washed with water to obtain a sixth dental alignment device.

Embodiment 3: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 12 bar to remove uncured resin and liquid, the second dental alignment device was obtained.

Thereafter, the second dental alignment device was post-cured at 75° C. to obtain the third dental alignment device. Then, the third dental alignment device was subjected to post-heating at a rate of 25° C./min, starting from a temperature of 75° C., to reach 25° C., resulting in the fourth dental alignment device. After that, the fourth dental alignment device was thoroughly cleaned with isopropyl alcohol to obtain the fifth dental alignment device. After 5 minutes, the fifth dental alignment device was completely washed with water to obtain a sixth dental alignment device.

Embodiment 4: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second dental alignment device was obtained.

Thereafter, the second dental alignment device was post-cured at 60° C. to obtain the third dental alignment device. Then, the third dental alignment device was subjected to post-heating at a rate of 25° C./min, starting from a temperature of 60° C., to reach 25° C., resulting in the fourth dental alignment device. After that, the fourth dental alignment device was thoroughly cleaned with isopropyl alcohol to obtain the fifth dental alignment device. After 5 minutes, the fifth dental alignment device was completely washed with water to obtain a sixth dental alignment device.

Embodiment 5: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second dental alignment device was obtained.

Thereafter, the second dental alignment device was post-cured at 90° C. to obtain the third dental alignment device. Then, the third dental alignment device was subjected to post-heating at a rate of 25° C./min, starting from a temperature of 90° C., to reach 25° C., resulting in the fourth dental alignment device. After that, the fourth dental alignment device was thoroughly cleaned with isopropyl alcohol to obtain the fifth dental alignment device. After 5 minutes, the fifth dental alignment device was completely washed with water to obtain a sixth dental alignment device.

Embodiment 6: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second dental alignment device was obtained.

Thereafter, the second dental alignment device was post-cured at 75° C. to obtain the third dental alignment device. Then, the third dental alignment device was subjected to post-heating at a rate of 5° C./min, starting from a temperature of 75° C., to reach 25° C., resulting in the fourth dental alignment device. After that, the fourth dental alignment device was thoroughly cleaned with isopropyl alcohol to obtain the fifth dental alignment device. After 5 minutes, the fifth dental alignment device was completely washed with water to obtain a sixth dental alignment device.

Embodiment 7: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second dental alignment device was obtained.

Thereafter, the second dental alignment device was post-cured at 75° C. to obtain the third dental alignment device. Then, the third dental alignment device was subjected to post-heating at a rate of 25° C./min, starting from a temperature of 75° C., to reach 50° C., resulting in the fourth dental alignment device. After that, the fourth dental alignment device was thoroughly cleaned with isopropyl alcohol to obtain the fifth dental alignment device. After 5 minutes, the fifth dental alignment device was completely washed with water to obtain a sixth dental alignment device.

Embodiment 8: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second dental alignment device was obtained.

Thereafter, the second dental alignment device was post-cured at 75° C. to obtain the third dental alignment device. Then, the third dental alignment device was subjected to post-heating at a rate of 25° C./min, starting from a temperature of 75° C., to reach 25° C., resulting in the fourth dental alignment device. After that, the fourth dental alignment device was thoroughly cleaned with isopropyl alcohol to obtain the fifth dental alignment device. After 20 minute, the fifth dental alignment device was completely washed with water to obtain a sixth dental alignment device.

Comparative Example 1: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. After that, the first dental alignment device was thoroughly cleaned with isopropyl alcohol to obtain the second dental alignment device. Thereafter, the second dental alignment device was post-cured at 75° C. and the third dental alignment device was obtained. After that, the third dental alignment device was subjected to post-heating at a rate of 25° C./min, starting from a temperature of 75° C., to reach 25° C., resulting in the fourth dental alignment device.

Comparative Example 2: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 3 bar to remove uncured resin and liquid, the second dental alignment device was obtained. Thereafter, the second dental alignment device was post-cured at 75° C. and the third dental alignment device was obtained. After that, the third dental alignment device was subjected to post-heating at a rate of 25° C./min, starting from a temperature of 75° C., to reach 25° C., resulting in the fourth dental alignment device. After that, the fourth dental alignment device was thoroughly cleaned with isopropyl alcohol to obtain the fifth dental alignment device. After 5 minutes, the fifth dental alignment device was completely washed with water to obtain a sixth dental alignment device.

Comparative Example 3: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 14 bar to remove uncured resin and liquid, the second dental alignment device was obtained. Thereafter, the second dental alignment device was post-cured at 75° C. and the third dental alignment device was obtained. After that, the third dental alignment device was subjected to post-heating at a rate of 25° C./min, starting from a temperature of 75° C., to reach 25° C., resulting in the fourth dental alignment device. After that, the fourth dental alignment device was thoroughly cleaned with isopropyl alcohol to obtain the fifth dental alignment device. After 5 minutes, the fifth dental alignment device was completely washed with water to obtain a sixth dental alignment device.

Comparative Example 4: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second dental alignment device was obtained. Thereafter, the second dental alignment device was post-cured at 30° C. and the third dental alignment device was obtained. After that, the third dental alignment device was subjected to post-heating at a rate of 25° C./min, starting from a temperature of 30° C., to reach 25° C., resulting in the fourth dental alignment device. After that, the fourth dental alignment device was thoroughly cleaned with isopropyl alcohol to obtain the fifth dental alignment device. After 5 minutes, the fifth dental alignment device was completely washed with water to obtain a sixth dental alignment device.

Comparative Example 5: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second device dental alignment was obtained. Thereafter, the second dental alignment device was post-cured at 120° C. and the third dental alignment device was obtained. After that, the third dental alignment device was subjected to post-heating at a rate of 25° C./min, starting from a temperature of 120° C., to reach 25° C., resulting in the fourth dental alignment device. After that, the fourth dental alignment device was thoroughly cleaned with isopropyl alcohol to obtain the fifth dental alignment 5 minutes, the fifth dental alignment device was completely washed with water to obtain a sixth dental alignment device.

Comparative Example 6: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second dental alignment device was obtained. Thereafter, the second dental alignment device was post-cured at 75° C. and the third dental alignment device was obtained. After that, the third dental alignment device was subjected to post-heating at a rate of 30° C./min, starting from a temperature of 75° C., to reach 25° C., resulting in the fourth dental alignment device. After that, the fourth dental alignment device was thoroughly cleaned with isopropyl alcohol to obtain the fifth dental alignment device. After 5 minutes, the fifth dental alignment device was completely washed with water to obtain a sixth dental alignment device.

Comparative Example 7: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second dental alignment device was obtained. Thereafter, the second dental alignment device was post-cured at 75° C. and the third dental alignment device was obtained. After that, the post-cured third orthodontic appliance was completely washed with isopropyl alcohol without post-heat treatment to obtain a fourth dental alignment device. After 5 minutes, the fourth dental alignment device was completely washed with water to obtain a fifth dental alignment device.

Comparative Example 8: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second dental alignment device was obtained. Thereafter, the second dental alignment device was post-cured at 75° C. and the third dental alignment device was obtained. After that, the third dental alignment device was subjected to post-heating at a rate of 25° C./min, starting from a temperature of 75° C., to reach 25° C., resulting in the fourth dental alignment device. After that, the fourth dental alignment device was thoroughly cleaned with isopropyl alcohol to obtain the fifth dental alignment device. Immediately thereafter, without any time interval, the fifth dental alignment device was completely washed with water to obtain a sixth dental alignment device.

Reference Example 1: Manufacture of Transparent Dental Alignment Device

First, the first dental alignment device was printed through a 3D printer by using the composition for forming the Transparent Dental Alignment Device prepared in Manufacturing Example 1 as a raw material. The first dental alignment device was partially cured. Then, by spraying compressed air with an air gun onto the first dental alignment device at 8 bar to remove uncured resin and liquid, the second dental alignment device was obtained. Thereafter, the second dental alignment device was post-cured at 75° C. and the third dental alignment device was obtained. After that, the third dental alignment device was subjected to post-heating at a rate of 25° C./min, starting from a temperature of 75° C., to reach 25° C., resulting in the fourth dental alignment device. After 1 minute, the fourth dental alignment device was completely washed with water to obtain a fifth dental alignment device.

Evaluation Example 1: Transparency Evaluation of Transparent Dental Alignment Device Sensory evaluations were conducted on the manufactured Transparent Dental Alignment Devices in the above Embodiment and Comparative Examples. Specifically, five trained evaluators conducted sensory evaluations with following manners. The transparency level of each Transparent Dental Alignment Device was visually observed and evaluated on a 5-point method, and the average scores were calculated and presented in Table 2 below. In this table, higher scores for each item indicate higher transparency levels for the corresponding item.

Furthermore, pictures of the dental alignment devices manufactured in Embodiment 1, Comparative Example 1, Comparative Example 2, and Comparative Example 6 were presented in FIG. 1 to FIG. 4, respectively.

TABLE 2

|  | Embodiment | | | | | | | |
| --- | --- | --- | --- | --- | --- | --- | --- | --- |
|  | 1 | 2 | 3 | 4 | 5 | 6 | 7 | 8 |
| Transparency | 5.0 | 4.8 | 4.9 | 4.9 | 4.8 | 4.8 | 5.0 | 4.9 |

|  | Comparative Example | | | | | | | | Reference example |
| --- | --- | --- | --- | --- | --- | --- | --- | --- | --- |
|  | 1 | 2 | 3 | 4 | 5 | 6 | 7 | 8 | 1 |
| Transparency | 0.1 | 3.5 | 3.0 | 3.0 | 3.2 | 3.6 | 3.0 | 3.9 | 4.2 |

Referring to Table 2 and FIGS. 1 to 4, it was observed that the Transparent Dental Alignment Devices in Embodiments 1 to 8 showed higher transparency than the Transparent Dental Alignment Devices of Comparative Examples 1 to 8 and Reference Example 1.

In the above, preferred embodiments according to the present invention have been described with reference to the figures and embodiments, but these are merely illustrative. In the above, preferred embodiments according to the present invention have been described in the figures and embodiments, but these are merely illustrative. And those with ordinary skills in the art will understand that various modifications and equivalent other implementations are possible from it. Therefore, the scope of protection of the present invention should be determined by the appended claims.

Effects of the Invention

The manufacturing method of the Transparent Dental Alignment Device according to an embodiment of the present invention can provide a Transparent Dental Alignment Device.

BEST MODE FOR CARRYING OUT THE INVENTION

Figure 1:
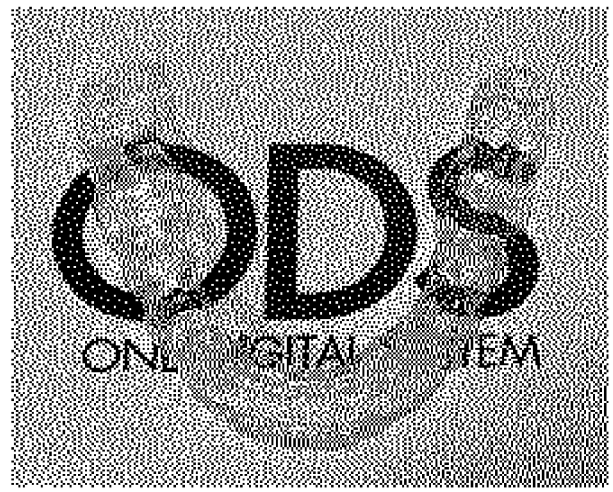
FIG. 1 is a photograph illustrating the Transparent Dental Alignment Device manufactured in embodiment 1.
Figure 2:
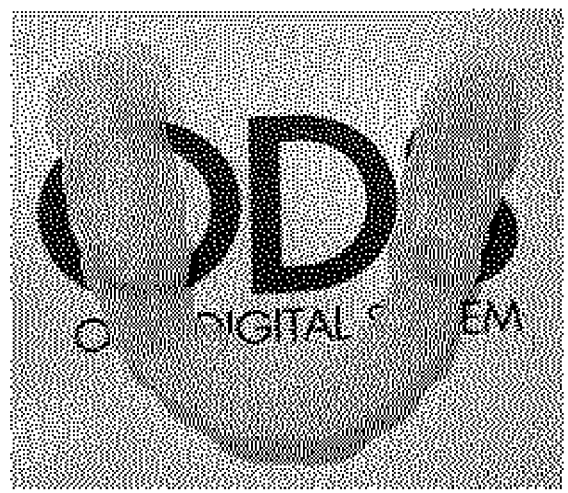
FIG. 2 is a photograph illustrating the Transparent Dental Alignment Device manufactured in comparative example 1.
Figure 3:
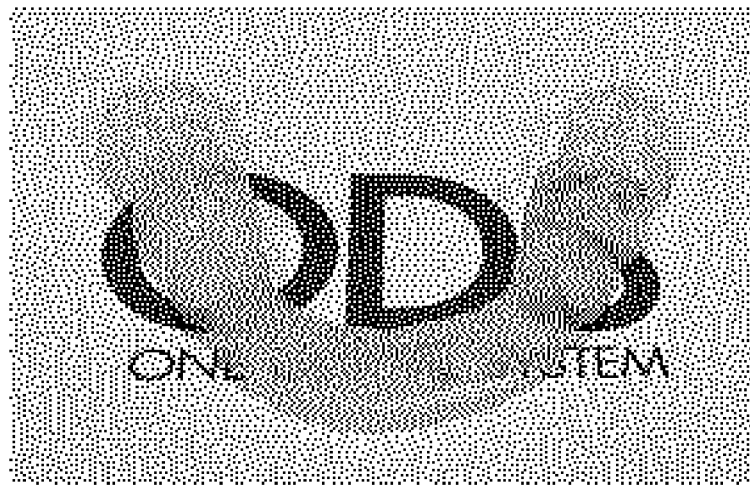
FIG. 3 is a photograph illustrating the Transparent Dental Alignment Device manufactured in comparative example 2.
Figure 4:
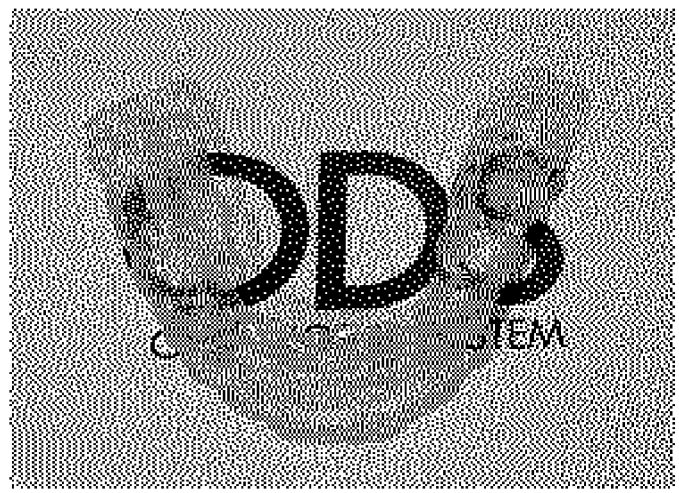
FIG. 4 is a photograph illustrating the Transparent Dental Alignment Device manufactured in comparative example 6.

One aspect of the present invention provides a manufacturing method for a Transparent Dental Alignment Device, containing the following steps:
   3D printing the dental alignment device using a composition for forming transparent dental alignment devices as the raw material (S10)
   Removing uncured resin and liquid from the dental alignment device obtained in step S10 (S20)
   Post-curing the dental alignment device obtained in step S20 (S30)
   Post heat treatment of the dental alignment device obtained in step S30 (S40)
   Cleaning the dental alignment device obtained in step S40 (S50).

Form for Implementing the Invention

One aspect of the present invention provides a manufacturing method for a Transparent Dental Alignment Device, containing the following steps:
   3D printing the dental alignment device using a composition for forming transparent dental alignment devices as the raw material (S10)
   Removing uncured resin and liquid from the dental alignment device obtained in step S10 (S20)
   Post-curing the dental alignment device obtained in step S20 (S30)
   Post heat treatment of the dental alignment device obtained in step S30 (S40)
   Cleaning the dental alignment device obtained in step S40 (S50).

The step (S20) can be performed by spraying compressed air with a pressure of 5-12 bar into the dental alignment device.

The step (S30) can be performed at a temperature of 60-90° C.

The step (S40) can be performed at a rate of less than or equal to 25° C./min, starting from a temperature of 60-90° C.

The step (S50) can include a cleaning solution washing step (S50-1) and a water rinsing step (S50-2).

Between the cleaning solution washing step (S50-1) and the water rinsing step (S50-2), there can be a time interval of 5 minutes or more to allow the cleaning solution to dry completely.

The invention claimed is:
1. A manufacturing method of a transparent dental alignment device, comprising:
   a step of 3D printing a dental alignment device using a raw material for forming transparent dental alignment devices;
   a step of removing uncured resin and liquid from the dental alignment device obtained in the step of 3D printing;
   a step of post-curing the dental alignment device obtained in the step of removing the uncured resin and liquid;
   a step of post heat treating the dental alignment device obtained in the step of post-curing; and
   a step of cleaning the dental alignment device obtained in the step of post heat treating;
wherein:
   the step of removing the uncured resin and liquid is performed by spraying compressed air with a pressure of 5-12 bar into the dental alignment device;
   the step of post-curing is performed at a temperature of 60-90° C.;
   the step of post heat treating is performed at a rate of less than or equal to 25° C./min, starting from a temperature of 60-90° C.; and
   the step of cleaning includes:
      a step of solution washing configured to wash the dental alignment device using a washing solution;
      a step of drying configured to dry the dental alignment device for 5 minutes or more to allow the washing solution to dry completely; and
      a step of water rising configured to rinse the dental alignment device using water.

* * * * *